US 8,896,713 B2

(12) United States Patent
Corey et al.

(10) Patent No.: US 8,896,713 B2
(45) Date of Patent: Nov. 25, 2014

(54) MOTION-BASED VIDEO STABILIZATION

(75) Inventors: Brandon Corey, Palo Alto, CA (US); George William, San Francisco, CA (US); Jianping Zhou, Fremont, CA (US)

(73) Assignee: Apple Inc., Cupertino, CA (US)

( * ) Notice: Subject to any disclaimer, the term of this patent is extended or adjusted under 35 U.S.C. 154(b) by 413 days.

(21) Appl. No.: 13/210,060

(22) Filed: Aug. 15, 2011

(65) Prior Publication Data
US 2013/0044228 A1 Feb. 21, 2013

(51) Int. Cl.
*H04N 5/228* (2006.01)
*H04N 5/232* (2006.01)

(52) U.S. Cl.
CPC ....... *H04N 5/23254* (2013.01); *H04N 5/23261* (2013.01); *H04N 5/23274* (2013.01)
USPC ............... 348/208.4; 348/208.12; 348/208.99

(58) Field of Classification Search
USPC .................. 348/208.99, 208.1–208.4, 208.12
See application file for complete search history.

(56) References Cited

U.S. PATENT DOCUMENTS

| | | | |
|---|---|---|---|
| 6,618,511 B1 | 9/2003 | Mancuso et al. | |
| 7,382,400 B2 | 6/2008 | Sablak | |
| 7,574,122 B2 | 8/2009 | Fukumoto et al. | |
| 7,576,778 B2 | 8/2009 | Hirota et al. | |
| 7,705,885 B2 | 4/2010 | Prieto et al. | |
| 2007/0081081 A1 | 4/2007 | Cheng | |
| 2007/0285562 A1 | 12/2007 | Raynor | |
| 2008/0246848 A1* | 10/2008 | Tsubaki et al. | 348/208.4 |
| 2009/0110377 A1* | 4/2009 | Unoki et al. | 386/131 |
| 2009/0208062 A1 | 8/2009 | Sorek et al. | |
| 2010/0194852 A1 | 8/2010 | Tseng et al. | |
| 2010/0245604 A1* | 9/2010 | Ohmiya et al. | 348/208.99 |
| 2011/0211082 A1* | 9/2011 | Forssen et al. | 348/208.2 |
| 2011/0234825 A1* | 9/2011 | Liu et al. | 348/208.5 |
| 2011/0304694 A1* | 12/2011 | Nestares et al. | 348/46 |
| 2012/0069203 A1* | 3/2012 | Voss et al. | 348/208.1 |

OTHER PUBLICATIONS

Meingast, Marci, et al., "Geometric Models of Rolling-Shutter Cameras", EECS Department, University of California Berkley, Mar. 29, 2005.
Chang, Li-Wen, et al., "Analysis and Compensation of Rolling Shutter Effect for CMOS Image Sensors", IEEE Transactions on Image Processing, vol. 17:8, pp. 1323-1330, Aug. 2008.
Forssen, Per-Erik, et al., "Rectifying rolling shutter video from handheld devices", 2010 IEEE Conference on Computer Vision and Pattern Recognition (CVPR), San Francisco CA, pp. 507-514, Jun. 13-18, 2010.
Heflin, Brian, et al., "Correcting Rolling-Shutter Distortion of CMOS Sensors using Facial Feature Detection", 2010 Fourth IEEE International Conference on Biometrics: Theory Applications and Systems (BTAS), Washington DC, pp. 1-6, Sep. 27-29, 2010.

(Continued)

*Primary Examiner* — Kelly L Jerabek
(74) *Attorney, Agent, or Firm* — Kenyon & Kenyon, LLP (57) ABSTRACT

Systems, methods, and computer readable media for stabilizing video frames based on information from a motion sensor are described. In general, digital video stabilization techniques are disclosed for generating and applying image-specific transformations to individual frames (images) in a video sequence after, rather than before, the image has been captured. The transformations may be used to counter-balance or compensate for unwanted jitter occurring during video capture due to, for example, a person's hand shaking.

29 Claims, 9 Drawing Sheets

(56) References Cited

OTHER PUBLICATIONS

Chun, Jung-Bum, et al., "Suppressing Rolling-Shutter Distortion of CMOS Image Sensors by Motion Vector Detection", IEEE Transactions on Consumer Electronics, vol. 54:4, pp. 1479-1487, Nov. 2008.
RollingShutter 1.1 User Guide for After Effects, The Foundry Visionmongers Ltd., 34 pgs., 2011.
Bradley, Derek, et al., "Synchronization and Rolling Shutter Compensation for Consumer Video Camera Arrays", IEEE Computer Society Conference on Computer Vision and Pattern Recognition Workshops, Miami FL, pp. 1-8, Jun. 20-25, 2009.
Nishino, Ko, "Introduction to Computer Vision", Week 2, Fall 2010.
PhotoSolid® Image Stabilization Technology by Morpho, Inc., http://www.morphoinc.com/en/products/PhotoSolid.html, 2 pages, 2011.
MovieSolid® Motion Stabilization Technology by Morpho, Inc., http://www.morphoinc.com/en/products/MovieSolid.html, 1 page, 2011.

* cited by examiner

MOTION-BASED VIDEO STABILIZATION

BACKGROUND

This disclosure relates generally to the field of image processing. More particularly, but not by way of limitation, this disclosure relates to compensating for unwanted motion experienced during video image capture operations.

Today, many personal electronic devices come equipped with digital cameras that are video capable. Example personal electronic devices of this sort include, but are not limited to, mobile telephones, personal digital assistants, portable music and video players and portable computer systems such as laptop, notebook and tablet computers. One common problem with video capture is unwanted motion of the camera. While some motion may be desired (e.g., the smooth pan of a camera across a scene), other motion is not (e.g., motion introduced by shaky hands or walking).

Many video capture devices include a gyroscopic sensor that may be used to assist various device functions. Some devices may use gyroscopic data to adjust the device's lens and/or sensor mechanism before an image or frame is captured. Once captured, however, the image is retained as part of the video sequence without substantial modification. This approach is not, however, feasible for many devices incorporating video capture capability. For example, at this time it is generally considered unfeasible to provide movable lens mechanisms and such in small form factor devices.

SUMMARY

In one embodiment the invention provides a method to stabilize a captured video sequence. The method includes obtaining a video sequence having a number of sequential images (each image associated with one or more image capture parameter values based on the video capture device) and associated motion data from the video capture device (e.g., accelerometer and/or gyroscopic data). Unwanted motion of the video capture device may then be estimated (based on the motion data and image capture parameters) and used to remove the estimated motion from the video sequence. The modified sequence of images may then be (compressed) stored in a memory. In another embodiment, a computer executable program to implement the method may be stored in any non-transitory media. In still another embodiment, a device capable of performing the described methods may be provided.

DETAILED DESCRIPTION

This disclosure pertains to systems, methods, and computer readable media for stabilizing video frames based on information obtained from a motion sensor (e.g., gyroscopic and accelerometer sensors). In general, digital video stabilization techniques are described for generating and applying image-specific transforms to already captured frames (images) in a video sequence so as to counter or compensate for unwanted jitter that occurred during video capture operations. Such jitter may be due, for example, to a person's hand shaking. In contrast to the prior art, video stabilization techniques described herein may be applied to captured images rather than to the image capture device itself before image capture.

In the following description, for purposes of explanation, numerous specific details are set forth in order to provide a thorough understanding of the inventive concepts. As part of the this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such subject matter. Reference in the specification to "one embodiment" or "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the digital video capture and processing field having the benefit of this disclosure.

Figure 1:
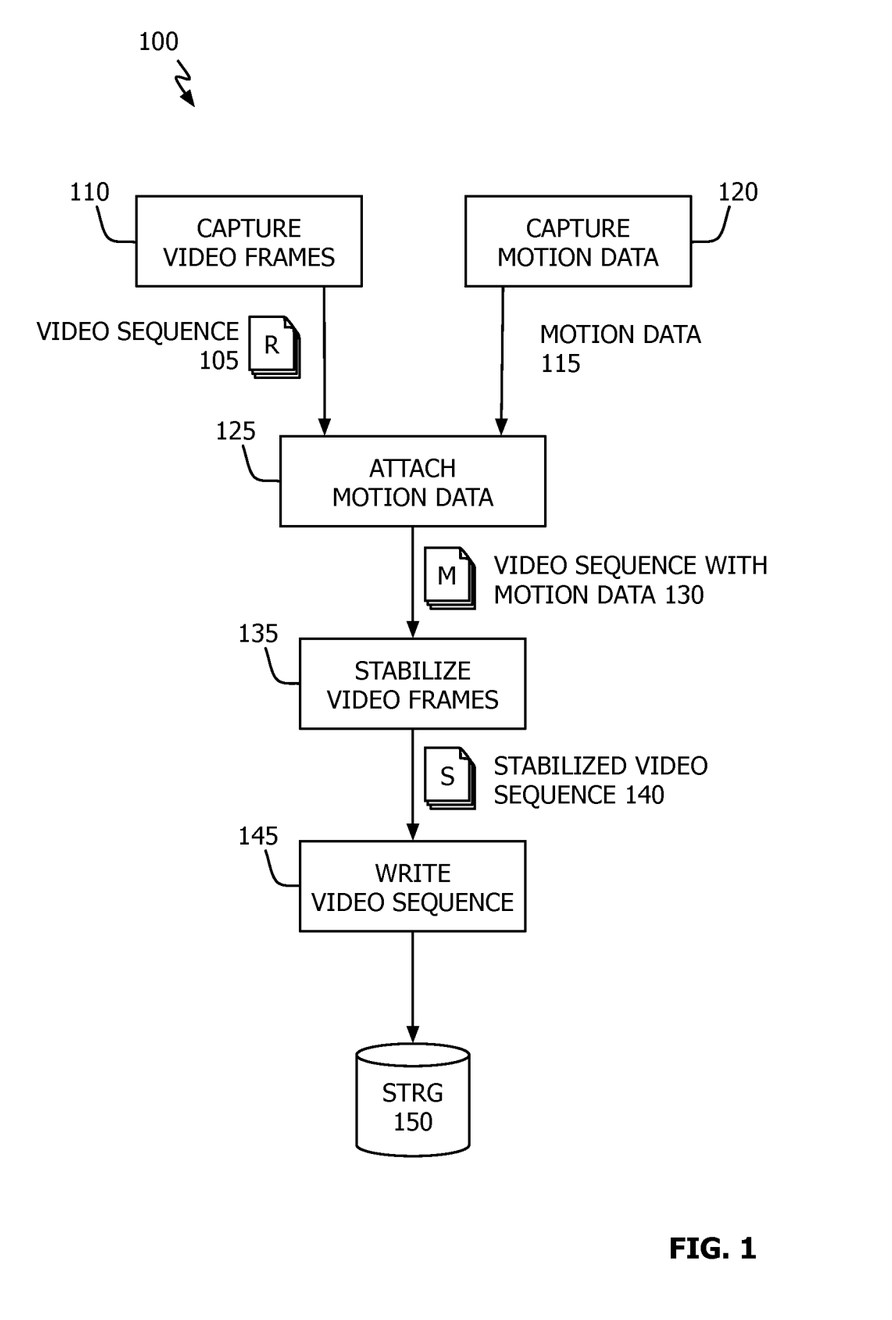
FIG. 1 shows, in flowchart form, a video stabilization operation in accordance with one embodiment.

Referring to FIG. 1, video stabilization operation 100 in accordance with one embodiment begins by capturing a video sequence 105 (block 110) and corresponding motion data 115 (block 120). Motion information 115 may then be attached to individual frames within video sequence 105 (block 125) to produce video sequence 130. It can be advantageous to capture motion data for each frame in video sequence 105 so that each captured frame has corresponding motion datum. Multiple data per frame is possible. It can also be advantageous, and is common, for each frame in a video sequence such as video sequence 105, to have a timestamp indicating when the particular frame was captured (e.g., during acts in accordance with block 110). Frames within video sequence 130 may then be stabilized with respect to a number of other frames in video sequence 130 (block 135). The result is stabilized video sequence 140 that may be compressed and written (block 145) to storage 150. Write operation in accordance with block 145 may also compress frames within video sequence 130

Figure 2A:
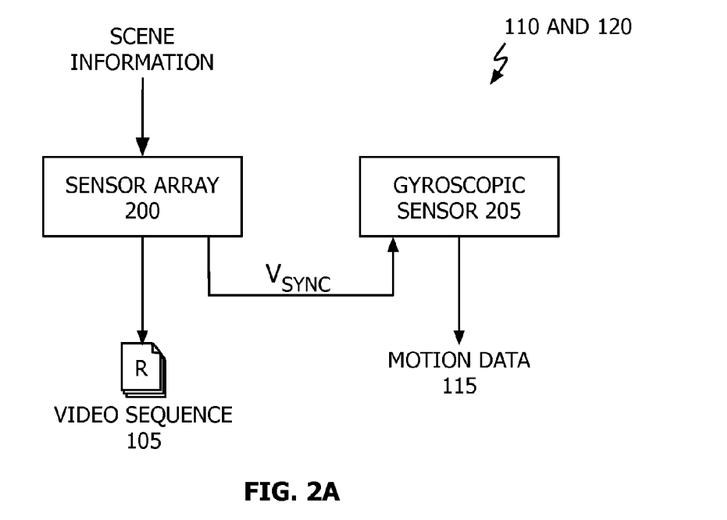
FIGS. 2A and 2B show, in block diagram form, two different embodiments for correlating image data with motion data.

Referring to FIG. 2A, in one embodiment video capture operation 110 may be preformed by sensor array 200 and motion data capture operation 120 may be performed by gyroscopic sensor (gyro) 205. Sensor array 200 may provide black and white or color images and use, for example, complementary metal-oxide semiconductor (CMOS) or charged-coupled device (CCD) technology. Gyro sensor 205 may be used to generate rate data in three dimensions (e.g., (x, y, z) or (pitch, roll, yaw) or in a quaternion system). Gyro sensor 205 may use any desired technology such as microelectromechanical systems (MEMS) technology.

Figure 2B:
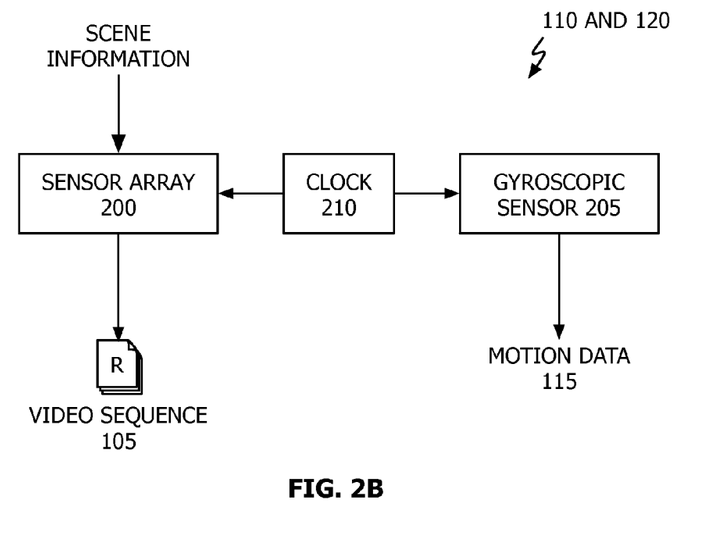

It will be understood that video captured in accordance with block 110 (e.g., by sensor array 200) and motion data captured in accordance with block 120 (e.g., by gyro sensor 205) should be correlated. It is important that an image captured at time $t_0$ be synchronized with motion data captured at approximately the same time. In the embodiment illustrated in FIG. 2A, image sensor 200 may signal gyro sensor 205 each time an image frame is captured through, for example, the $V_{sync}$ signal. Gyro sensor 205, in turn, may tag each "next captured" motion datum each time a $V_{sync}$ signal is received. This permits each frame in video sequence 105 to be correlated or associated with the proper motion data. Use of the phrase "next captured" reflects the possibility that motion sensor 205 may operate on a different clock signal than sensor array 200. That is, sensor array 200 and motion sensor 205 may operate asynchronously. Referring to FIG. 2B, in another embodiment a common clock 210 may be used to timestamp both image sensor data and motion sensor data. This arrangement facilitates the synchronization of asynchronously captured image and motion data by putting them on a common timeline.

Figure 3:
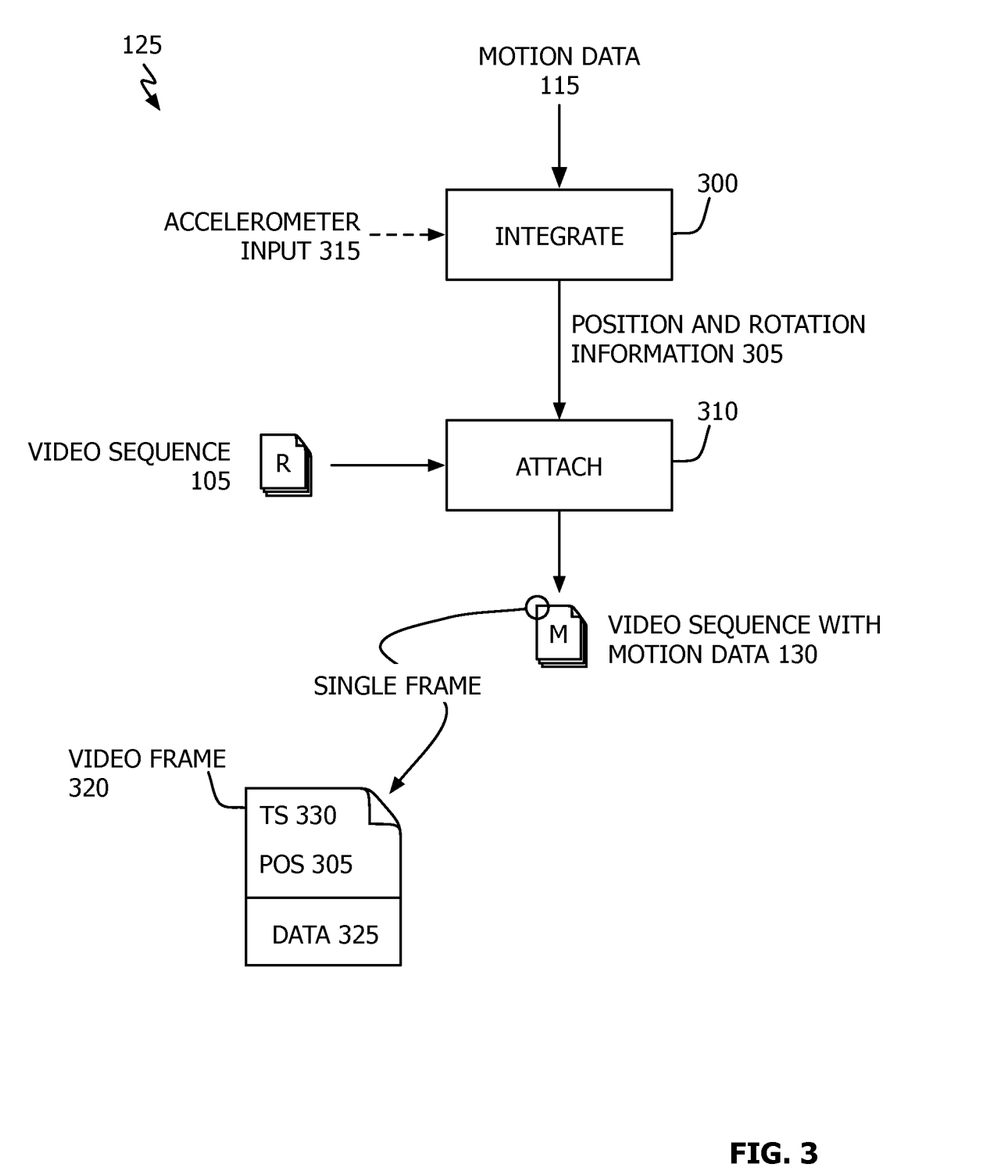
FIG. 3 shows, in flowchart form, motion data being processed and attached to video data in accordance with one embodiment.

Referring to FIG. 3, in one embodiment motion data 115 (e.g., accelerometer and/or gyro data) may be attached to video data (video sequence 105) through a process such as that illustrated in FIG. 3. In one embodiment motion data 115 includes accelerometer data. In another embodiment, motion data 115 gyro data In yet another embodiment, motion data 115 includes both accelerometer and gyro data. For illustrative purposes, the example embodiment described herein will (for the most part) employ gyro data. It will be understood that when a gyro such as sensor 205 is used to provide motion data 115, what is actually produced is rate information: the rate at which the video capture device is being moved in, for example, each of 3 axis. Rate data may be integrated (block 300) to produce instantaneous position and rotation information 305 (also in each of 3 axis). Using image timestamp information and motion detector tags (which may also be timestamps), each frame in video sequence 105 may be associated with the appropriate position and rotation information 305 (block 310). In another embodiment, operation 125 may also use accelerometer input 315 to, for example, assist in calibrating gyro sensor 205's output or for motion data itself. Also shown in FIG. 3 is a high-level representation of a single image frame 320 from video sequence 130. As shown, video frame 320 includes data 325 representing the image itself and timestamp 330 provided during acts in accordance with block 110. After attach operation 310, video frame 320 may also include position and rotation information 305 (aka, motion data).

Figure 4:
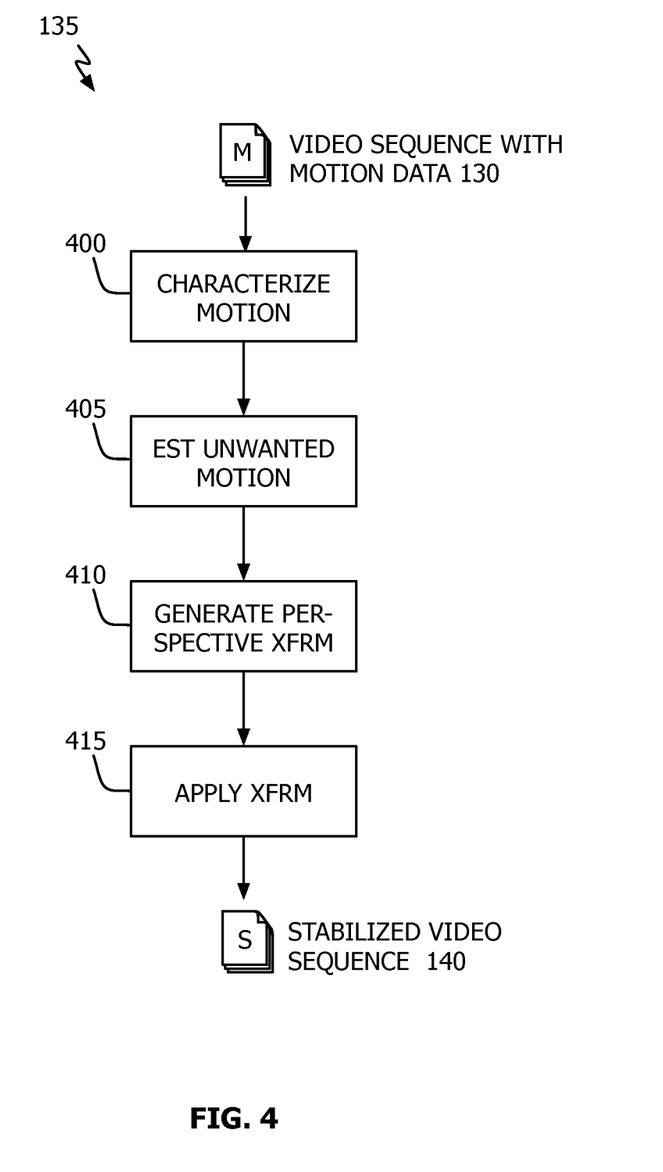
FIG. 4 shows, in flowchart form, a video stabilization operation in accordance with another embodiment.
Figure 5A:
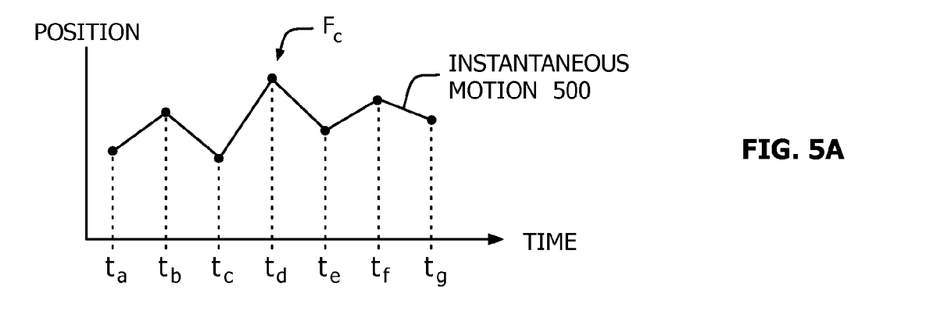
FIGS. 5A and 5B illustrate specific aspects of a video stabilization operation in accordance with one embodiment.

Referring to FIG. 4, stabilization operation 135 as implemented in one embodiment may begin once images making up video sequence 130 begin to be received. Initially, the motion of a frame may be characterized with respect to a specified number of "neighbor" frames (block 400). Referring to FIG. 5A, in one embodiment the motion of a current frame ($F_c$) captured at time $t_d$ may be characterized by M number of previously captured frames (in this example 3: captured at prior times $t_a$, $t_b$, and $t_c$) and N number of subsequently captured frames (in this example also 3: captured at later times $t_e$, $t_f$, and $t_g$). FIG. 5A plots the instantaneous position of each of these frames over time (represented as instantaneous motion signal 500). The solid lines between successive points have been provided to illustrate the "jittery" nature of motion data 115. It should be understood that only a single axis of motion is represented in FIG. 5, but that in many practical applications motion in three dimensions may be considered. It should also be noted that the choice of 3 frames before and 3 frames after the current frame is a design choice and may vary from implementation to implementation depending on, for example, the image sensor (e.g., sensor array 200), the particular type of video capture unit being used (e.g., a professional stand-alone unit, a consumer stand-alone unit, or embedded in a consumer device such as a mobile telephone, portable music player or some other portable electronic device), and the rate of video frame capture.

Figure 5B:
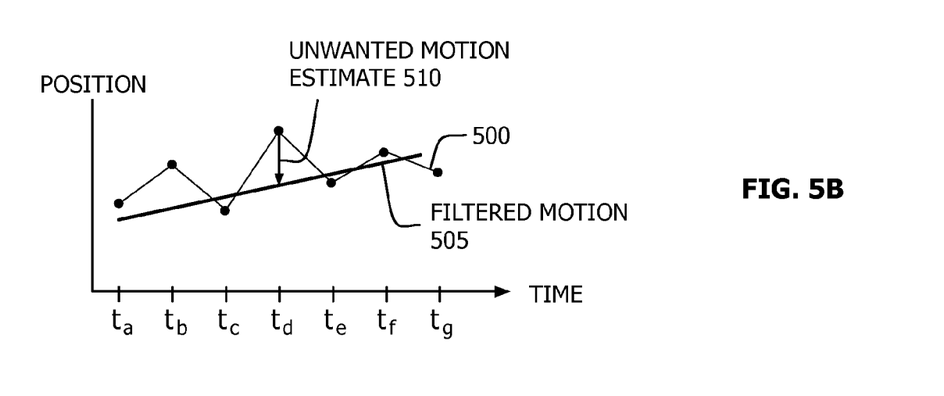

Returning to FIG. 4, it is assumed that slow/smooth motion in a given direction is desired by the individual capturing the video sequence. For example, the video capture device may be smoothly panned to keep a specific target (e.g., a person) centered in the frame. It follows that any jerky or high-frequency motion (e.g., jitter) is unintended (e.g., due to the individual's hand shaking). With this as background, and the motion of a frame characterized in accordance with block 400, the unwanted aspects of the frame's motion may now be estimated (block 405). Referring to FIG. 5B, to estimate the unwanted motion components of the video capture device's movement, instantaneous motion signal 500 may be filtered to eliminate its high-frequency components (producing filtered motion signal 505). This may be accomplished, for example, by passing instantaneous motion signal 500 through a low-pass filter such as an infinite impulse response (IIR) or finite impulse response (FIR) filter. An estimate of the unwanted motion for current frame $F_c$ (at time $t_d$) may then be given by the difference in the actual position of frame $F_c$ (at time $t_d$) and filtered motion signal 505 (at time $t_d$) 510. The "negative" of the estimated unwanted motion along each axis (e.g., x, y, z) may then be collected into a single 3×3 unwanted motion matrix. Hereinafter, the estimated unwanted motion matrix for the current frame will be represented as rotation matrix [$R_{12}$], where the subscript '2' represents or identifies the current frame and the subscript '1' represents or identifies a prior frame. In the example shown in FIG. 5A, the current frame would be $F_c$ (captured at time $t_d$) and the prior frame is that frame captured at time $t_c$. This process may be repeated for the next "current" frame in a sliding-window fashion. For example, in FIG. 5A the next frame to become the "current" frame would be frame $F_d$ (captured at time $t_e$). Continuing to use the 3 prior and 3 subsequent frame window introduced above, the prior frames upon which a new instantaneous motion signal would be based are those frames captured at times $t_d$, $t_c$ and $t_b$. The successive frames upon which the new instantaneous motion signal would be based are those frames captured at times $t_f$, $t_g$ and $t_h$ (not shown).

Returning again to FIG. 4, once an estimate of the unwanted motion for a frame has been determined in accordance with block 405, that information may be used to generate a perspective transformation (block 410). Each frame's perspective transformation may be applied to modify or compensate for the frame's estimated unwanted motion (block 415). The result is stabilized video sequence 140.

Figure 6:
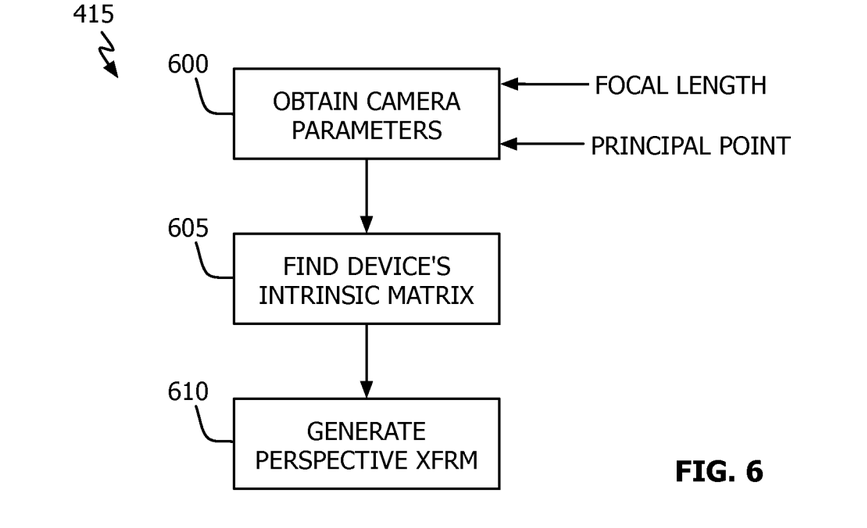
FIG. 6 shows, in flowchart form, one technique to generate a perspective transform in accordance with this disclosure.

Referring to FIG. 6, perspective transformation determination in accordance with block 410 obtains various image capture device parameter values (block 600). Illustrative parameters include those related to the image capture device's field of view for the frame such as the focal length used to capture the frame and the device's principal point. It will be recognized that on image capture devices that provide the capability to move their lens and/or image sensor assemblies, the focal length may change from frame to frame. Based on the obtained parameters' values, the device's intrinsic matrix may be found or generated (block 605). A perspective transformation may then be determined for a particular frame using the image capture device's intrinsic matrix associated with that frame (i.e., the intrinsic matrix generated using device parameter values that were in place when the frame was captured) and the frame's rotation matrix identified above (610).

A perspective transformation for a given frame may be derived as follows. First, it will be recognized by those of skill in the art that the 2D projection of real-space (which is 3D) onto a sensor array (which is 2D) may be given as—

$$\begin{pmatrix} x \\ y \\ z \end{pmatrix} = \Pi \begin{pmatrix} X \\ Y \\ Z \end{pmatrix}, \quad \text{EQ. 1}$$

where $$\begin{pmatrix} X \\ Y \\ Z \end{pmatrix}$$

represents a point in real-space, $\Pi$ represents the image capture device's intrinsic matrix and $$\begin{pmatrix} x \\ y \\ z \end{pmatrix}$$

represents the 2D projection of the real-space point onto the sensor array's plane. In essence, EQ. 1 represents a 3D-to-2D transformation.

A novel use of this known relationship was to recognize that—

$$\begin{pmatrix} X \\ Y \\ Z \end{pmatrix} = \Pi^{-1} \begin{pmatrix} x \\ y \\ z \end{pmatrix}, \quad \text{EQ. 2}$$

where $$\begin{pmatrix} x \\ y \\ z \end{pmatrix}$$

represents a point in the sensor's 2D plane, $$\begin{pmatrix} X \\ Y \\ Z \end{pmatrix}$$

represents an estimate of where that point is in real-space, and $\Pi^{-1}$ represents the inverse of the image capture device's intrinsic matrix described above with respect to EQ 1. Thus, EQ. 2 represents a 3D-to-2D transformation estimator.

Based on the discussion above regarding blocks 400, 405 and FIG. 5, it will be recognized that—

$$\begin{pmatrix} X'_1 \\ Y'_1 \\ Z'_1 \end{pmatrix} = [R_1] \begin{pmatrix} X_1 \\ Y_1 \\ Z_1 \end{pmatrix}, \quad \text{EQ. 3}$$

where $$\begin{pmatrix} X_1 \\ Y_1 \\ Z_1 \end{pmatrix}$$

represents the real-space location of a point at time $t_1$, $[R_1]$ the rotation matrix for frame-1 (derived from unwanted motion in frame $F_1$), and $$\begin{pmatrix} X'_1 \\ Y'_1 \\ Z'_1 \end{pmatrix}$$

represents the location of the same point after the estimated unwanted motion has been removed.

From EQ. 2 we may obtain—

$$\begin{pmatrix} X_1 \\ Y_1 \\ Z_1 \end{pmatrix} = \Pi_1^{-1} \begin{pmatrix} x_1 \\ y_1 \\ z_1 \end{pmatrix}, \quad \text{EQ. 4}$$

where $\Pi_1^{-1}$ represents the inverse of the image capture device's intrinsic matrix at time $t_1$. Substituting EQ. 4 into EQ. 3 yields—

$$\begin{pmatrix} X'_1 \\ Y'_1 \\ Z'_1 \end{pmatrix} = [R_1]\Pi_1^{-1} \begin{pmatrix} x_1 \\ y_1 \\ z_1 \end{pmatrix}. \quad \text{EQ. 5}$$

From EQ. 2 we may obtain—

$$\begin{pmatrix} X'_1 \\ Y'_1 \\ Z'_1 \end{pmatrix} = \Pi_1^{-1} \begin{pmatrix} x'_1 \\ y'_1 \\ z'_1 \end{pmatrix}, \quad \text{EQ. 6}$$

Substituting EQ. 6 into EQ. 5 yields—

$$\Pi_1^{-1} \begin{pmatrix} x'_1 \\ y'_1 \\ z'_1 \end{pmatrix} = [R_1] \Pi_1^{-1} \begin{pmatrix} x_1 \\ y_1 \\ z_1 \end{pmatrix}. \quad \text{EQ. 7}$$

Multiplying EQ. 7 by $\Pi_1$ yields—

$$\Pi_1 \Pi_1^{-1} \begin{pmatrix} x'_1 \\ y'_1 \\ z'_1 \end{pmatrix} = \Pi_1 [R_1] \Pi_1^{-1} \begin{pmatrix} x_1 \\ y_1 \\ z_1 \end{pmatrix}, \quad \text{EQ. 8}$$

which may be rewritten as—

$$\begin{pmatrix} x'_1 \\ y'_1 \\ z'_1 \end{pmatrix} = \Pi_1 [R_1] \Pi_1^{-1} \begin{pmatrix} x_1 \\ y_1 \\ z_1 \end{pmatrix}. \quad \text{EQ. 9}$$

which may be rewritten as—

$$\begin{pmatrix} x'_1 \\ y'_1 \\ z'_1 \end{pmatrix} = [P_1] \begin{pmatrix} x1 \\ y_1 \\ z1 \end{pmatrix}, \quad \text{EQ. 10}$$

where $[P_1]$ represents the perspective transformation for time $t_1$ (and frame $F_1$). Equations 9 and 10 describe how remove unwanted motion from the image captured at time $t_1$ as reflected in rotation matrix $[R_1]$. (It is also noted $[P_1]$ incorporates the image capture device's parameters (e.g., focal length) at times $t_0$ and $t_1$.) More particularly, perspective transformation $[P_1]$ is based solely on the image capture device's parameter values (e.g., focal length) and determination of the image's unwanted motion component. This information is available from motion sensor 205 (e.g., a gyro). It will be recognized that this information is computationally inexpensive to obtain and process, allowing video stabilization operations in accordance with this disclosure to be performed quickly and at low computational cost.

Figure 7:
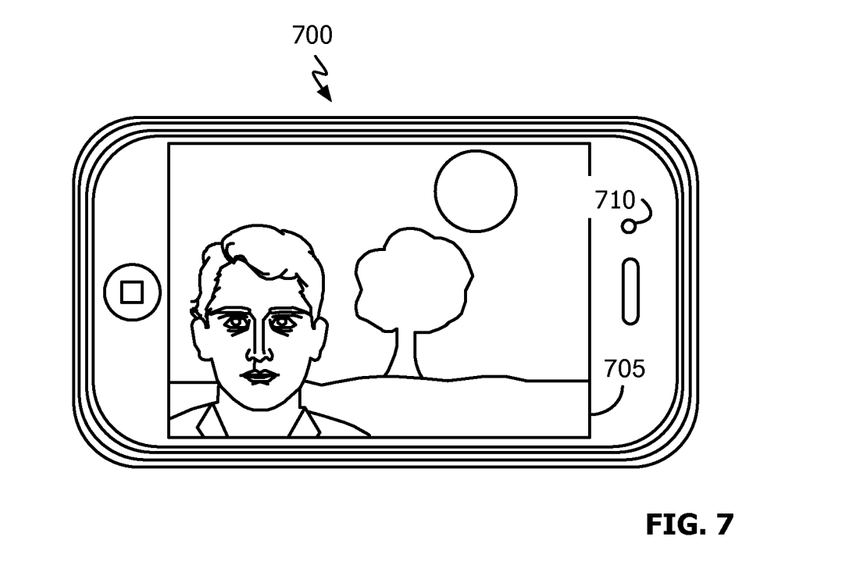
FIG. 7 shows an illustrative electronic device incorporating digital video capture capability in accordance with this disclosure.

Referring to FIG. 7, one electronic device incorporating digital video stabilization capability in accordance with one embodiment is shown. In this particular example, device 700 represents a mobile telephone which provides preview display 705. Mobile telephone 700 also includes microphone 710 and one or more speakers (not shown). It will be recognized that the disclosed video stabilization capability may be incorporated in many electronic devices. Examples include, but are not limited to, stand-alone video cameras, mobile music players, personal digital assistants (PDAs), and notebook, desktop and tablet computers.

Figure 8A:
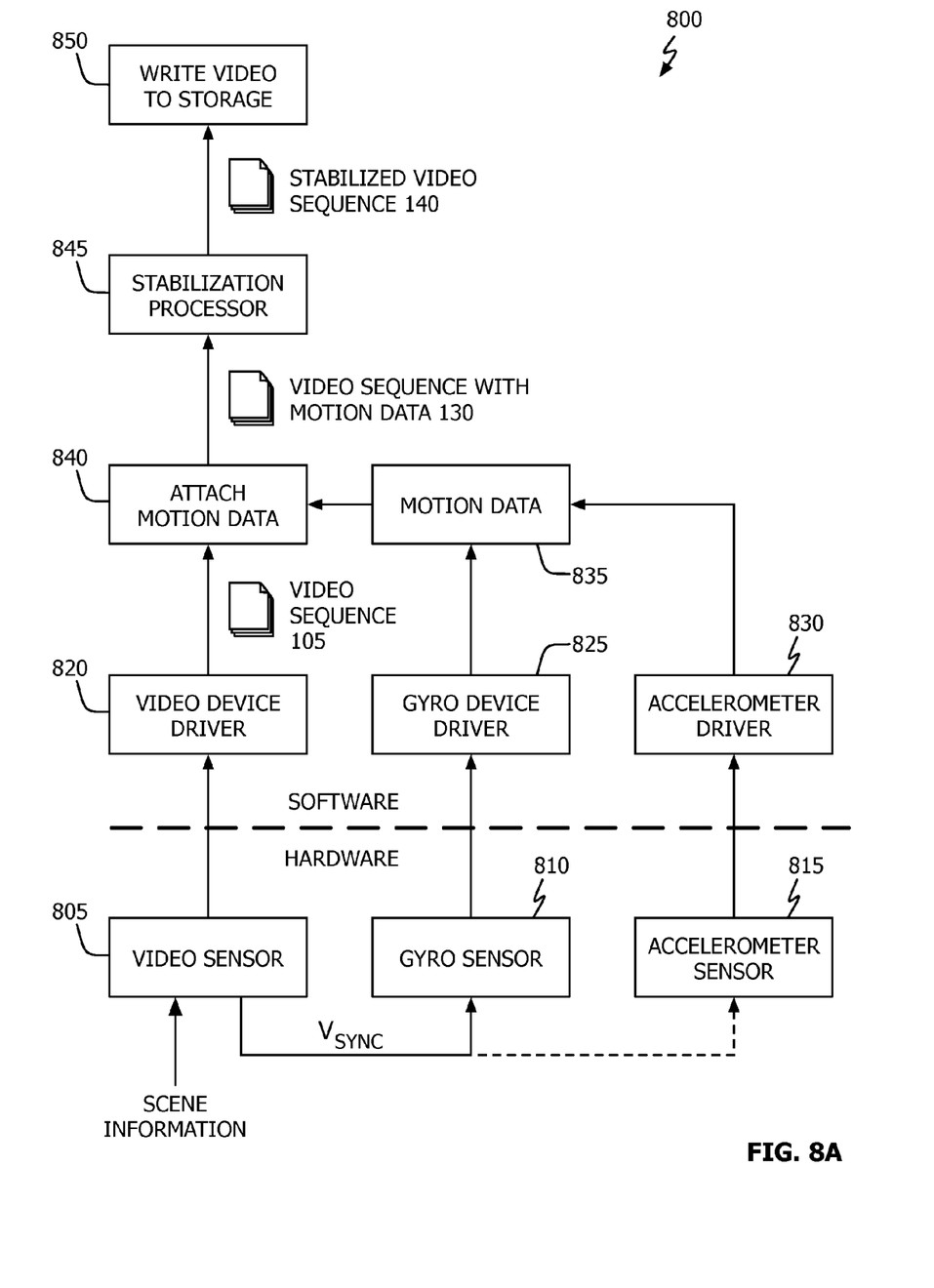
FIGS. 8A and 8B show, in a functional block diagram, two illustrative devices capable of providing video stabilization capability in accordance with this disclosure.

Referring to FIG. 8A, a functional view of illustrative electronic device 800 in accordance with this disclosure includes video sensor 805, gyro sensor 810, and accelerometer 815. Video sensor 805 provides video frames to video device driver 820, gyro sensor 810 provides motion data (e.g., rate of movement) to gyro device driver 825, and accelerometer 815 provides its data to accelerometer driver 830. In the example of FIG. 8A, video frames and motion data are correlated through the use of a $V_{sync}$ signal as discussed above with respect to FIG. 2A. It will be recognized that $V_{sync}$ may also be used to correlate accelerometer data (this possibility is indicated in FIG. 8A by a dashed line.) Gyro and accelerometer data may be collected to generate motion data 835 which may then be attached 840 to individual frames within video sequence 105. Once motion data has been attached, augmented video sequence 130 may be sent to stabilization processor 845 which transforms each frame in accordance with its particular perspective transformation to generate a stabilized video sequence 140 that may then be written to storage 850. It will be recognized that stabilized video sequence 140 may often be compressed before being written to storage 850.

Figure 8B:
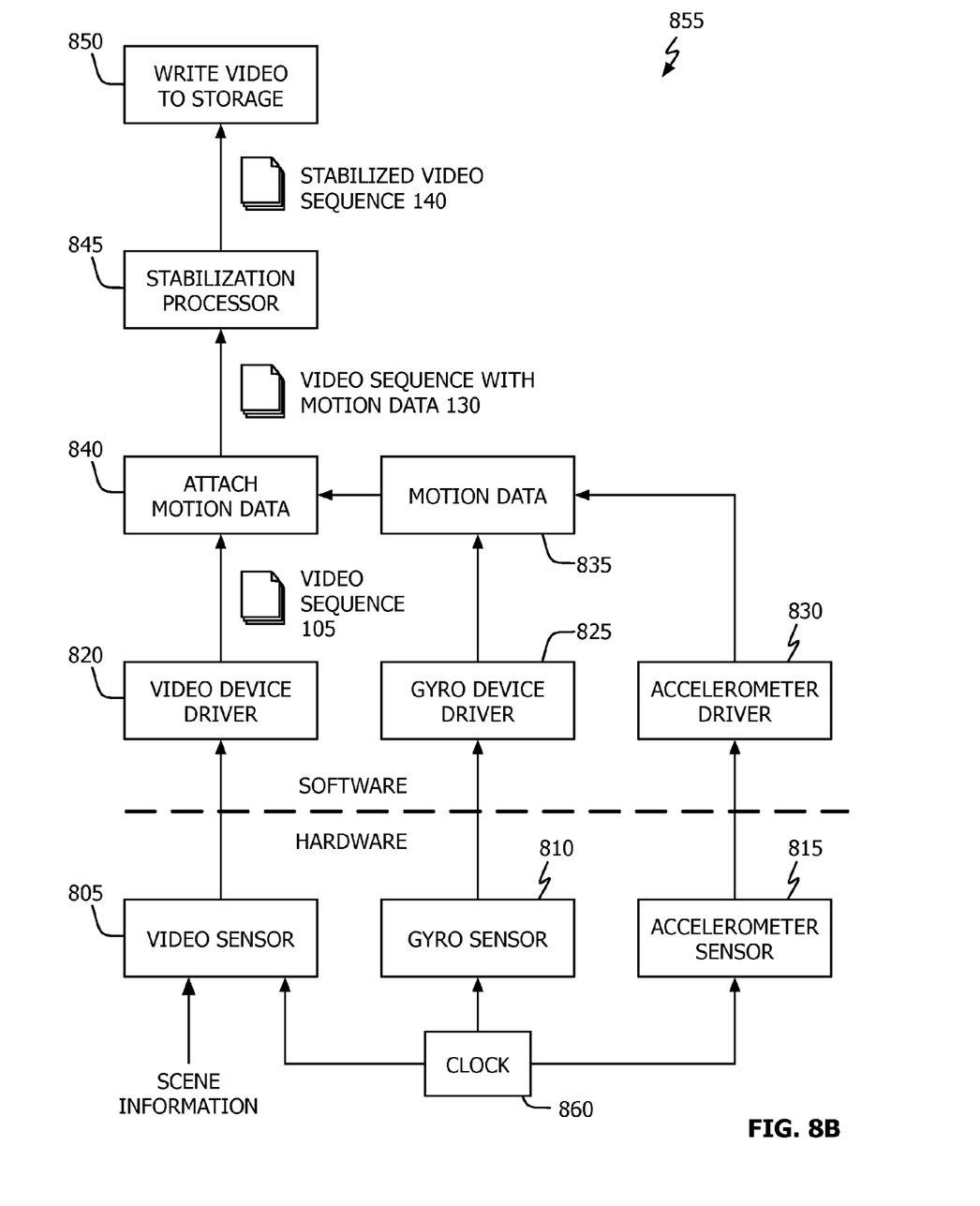

Referring to FIG. 8B, another illustrative video capture device 855 is shown. In this embodiment, however, common clock 860 provides timing information to video 805, gyro 810 and accelerometer 815 sensors. As noted above with respect to FIG. 2B, use of common clock 860 permits synchronization on a common timeline of asynchronously captured image and motion data.

Figure 9:
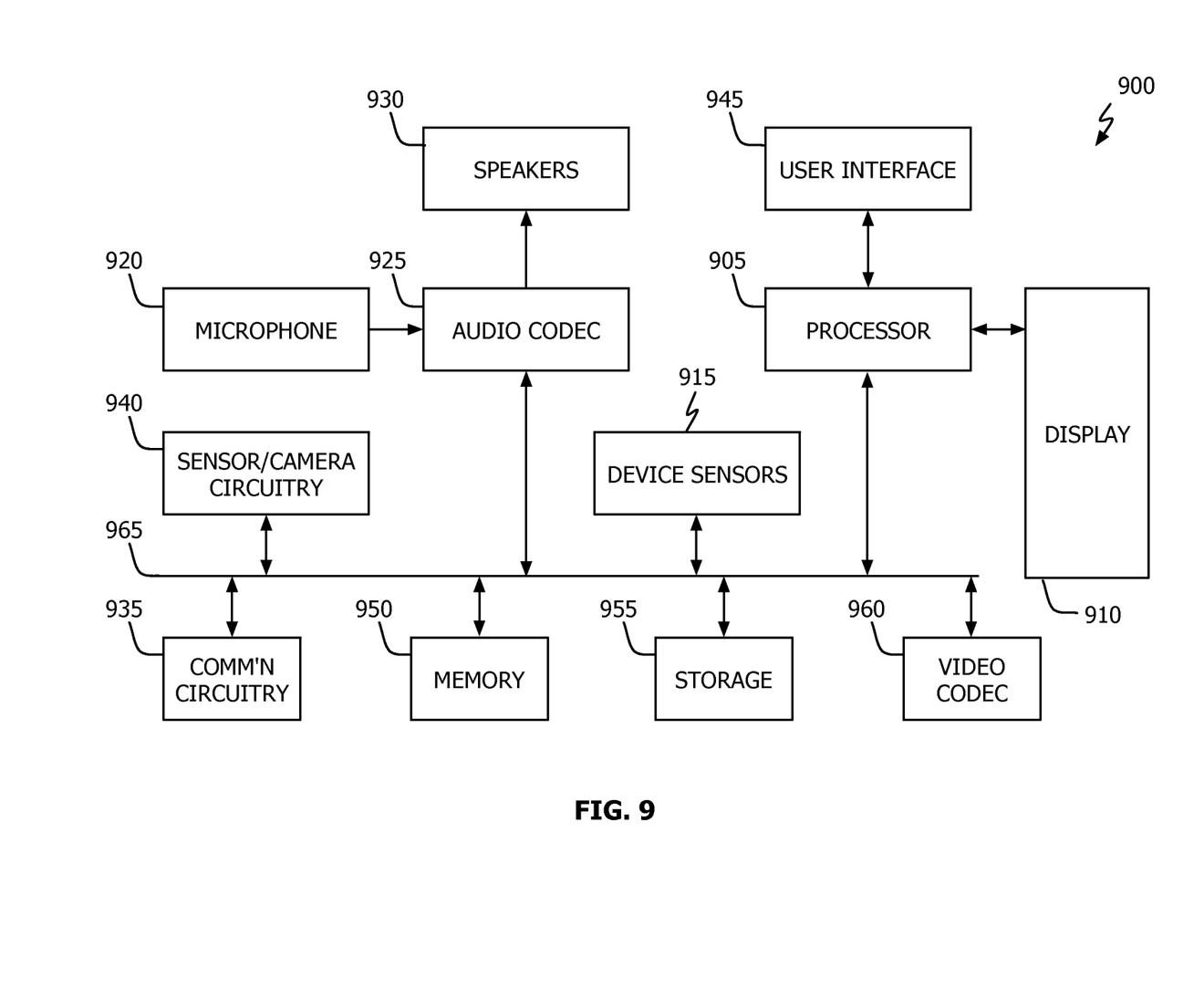
FIG. 9 shows, in block diagram form, an electronic device in accordance with one embodiment.

Referring now to FIG. 9, a simplified functional block diagram of representative electronic device 900 incorporating digital video capture capability is shown according to one embodiment. Electronic device 900 may include processor 905, display 910, device sensors 915 (e.g., gyro, accelerometer, proximity, and ambient light sensors), microphone 920, audio codec 925, speaker 930, communications circuitry 935, image sensor with associated camera and video hardware 940, user interface 945, memory 950, storage device 955, video codec(s) 960 and communications bus 965.

Processor 905 may be any suitable programmable control device or general or special purpose processor or integrated circuit and may execute instructions necessary to carry out or control the operation of many functions, such as the generation and/or processing of image metadata, as well as other functions performed by electronic device 900. Processor 905 may for instance drive display 910 and may receive user input from user interface 945. Processor 905 may also, for example, be a system-on-chip such as an application's processor such as those found in mobile devices or a dedicated graphics processing unit (GPU). Processor 905 may be based on reduced instruction-set computer (RISC) or complex instruction-set computer (CISC) architectures or any other suitable architecture and may include one or more processing cores.

Memory 950 may include one or more different types of storage media used by processor 905 to perform device functions. Memory 950 may include, for example, cache, read-only memory (ROM), and/or random access memory (RAM). Communications bus 960 may provide a data transfer path for transferring data to, from, or between at least storage device 955, memory 950, processor 905, and camera circuitry 940. User interface 945 may allow a user to interact with electronic device 900. For example, user interface 945 can take a variety of forms, such as a button, keypad, dial, a click wheel, or a touch screen.

Non-transitory storage device 955 may store media (e.g., image and video files), computer program instructions or software, preference information, device profile information, and any other suitable data. Storage device 955 may include one more storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Video codec 960 may be a hardware device, a software module or a combination of hardware and software that enables video compression and/or decompression of digital video. For example, video codec 960 may implement the H.264 video standard. Communications bus 965 may be any one or more communication paths and employ any technology or combination thereof that is appropriate for the particular implementation.

Software may be organized into one or more modules and be written in any suitable computer programming language (or more than one language). When executed by, for example, processor 905 such computer program code or software may implement one or more of the methods described herein.

Various changes in the materials, components, circuit elements, as well as in the details of the illustrated operational methods are possible without departing from the scope of the following claims. For instance, processor 905 may be implemented using two or more program control devices communicatively coupled. Each program control device may include the above-cited processors, special purpose processors or custom designed state machines that may be embodied in a hardware device such as an application specific integrated circuit (ASIC) or a field programmable gate array (FPGA). In addition, the techniques disclosed herein may be applied to previously captured video sequences, providing the necessary metadata has been captured for each video frame.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein.

The invention claimed is:

1. A motion sensor-based video stabilization method, comprising:
   capturing, by a video capture device, a video sequence having a plurality of sequential images, each of the plurality of sequential images associated with one or more image capture parameter values representing operational parameters of the video capture device;
   capturing, at the video capture device, motion data for each of the plurality of sequential images;
   estimating unwanted motion of the video capture device for each of the plurality of sequential images based on the motion data;
   estimating intrinsic data from the image capture parameter values, wherein each item of intrinsic data represents a mapping from a three-dimensional space to a two-dimensional space associated with a plane of the video capture device in the absence of motion, and wherein a respective item of intrinsic data is estimated for each of the plurality of sequential images;
   modifying each of the plurality of sequential images to remove the estimated unwanted motion based on the motion data and the image capture parameter values associated with each of the plurality of sequential images, wherein the modifying includes applying the intrinsic data to respective images; and
   storing each of the modified plurality of sequential images in a memory.

2. The method of claim 1, wherein the image capture parameters comprise one or more of a principal point and a focal length, and the intrinsic data are estimated based on the one or more of a principal point and a focal length.

3. The method of claim 1, wherein the act of capturing motion data for each of the plurality of sequential images comprises capturing motion data for each of the plurality of sequential images at approximately the same time as each of the plurality of sequential images was captured.

4. The method of claim 3, wherein the motion data for each of the plurality of sequential images comprises information representing motion in more than one direction.

5. The method of claim 1, wherein the act of capturing motion data comprises capturing motion data at a gyroscopic sensor.

6. The method of claim 5, wherein the act of capturing motion data further comprises capturing acceleration data at an accelerometer sensor.

7. The method of claim 1, further comprising determining rotational information for each of the plurality of sequential images based on the motion data for one or more successive images in the plurality of sequential images.

8. The method of claim 1, wherein the act of estimating unwanted motion for a specified image from the plurality of sequential images, comprises:
   identifying a motion of the video capture device based on a first specified number of images from the plurality of sequential images captured before the specified image and a second specified number of images from the plurality of sequential images captured after the specified image;
   filtering the identified motion of the video capture device to generate a filtered motion, the filtered motion having a value corresponding to the specified image; and
   determining the difference between the value of the filtered motion corresponding to the specified image and a location of the specified image based on the motion data.

9. The method of claim 8, wherein the act of filtering comprises low pass filtering.

10. The method of claim 1, wherein the image capture device comprises a portable electronic device.

11. The method of claim 1, wherein the image capture parameters include parameters representing a field of view of the video capture device.

12. The method of claim 1, wherein the image capture parameters include parameters representing a setting of a lens on the video capture device.

13. The method of claim 1, wherein the image capture parameters include parameters representing a setting of an image sensor assembly on the video capture device.

14. The method of claim 1, wherein each of the sequential images is associated with an image capture parameter value that changes based on settings of the video capture device.

15. The method of claim 1, wherein the step of estimating the intrinsic data comprises calculating, for each of the plurality of sequential images, a corresponding first matrix representing a projection of a point of the mapping, wherein each first matrix is calculated using at least one of a focal length of the video capture device at a time the image was captured and a principal point of the video capture device.

16. The method of claim 15, wherein the step of modifying each of the plurality of sequential images comprises:
   calculating, for each of the plurality of sequential images, a second matrix as an inverse of the image's first matrix; and combining each first matrix together with its corresponding second matrix and a third matrix representing the estimated unwanted motion in a matrix operation applied to a respective image, wherein each matrix operation outputs one of the modified plurality of sequential images.

17. A motion sensor-based video stabilization method, comprising:

capturing a plurality of sequential images by a video capture device, the video capture device having image capture parameters wherein each of the plurality of sequential images is associated with values corresponding to the image capture parameters at the time each of the images was captured;

capturing, at the video capture device, motion information for each of the plurality of sequential images, wherein the motion data for each image in the plurality of sequential images is captured at approximately the same time as each image was captured;

estimating an unwanted motion for each of the plurality of sequential images based on each image's motion information;

estimating intrinsic data from the image capture parameter values, wherein each item of intrinsic data represents a mapping from a three-dimensional space to a two-dimensional space associated with a plane of the video capture device in the absence of motion, and wherein a respective item of intrinsic data is estimated for each of the plurality of sequential images;

applying a transform to each of the plurality of sequential images to substantially remove the estimated unwanted motion, wherein the transform applied to each of the plurality of sequential images is based on each image's image capture parameter values and motion information, and wherein the transform includes applying the intrinsic data to respective images; and storing each of the transformed plurality of sequential images in a memory.

18. A non-transitory storage device having instructions stored thereon for causing a programmable control device to perform the following: capturing, by a video capture device, a video sequence having a plurality of sequential images, each of the plurality of sequential images associated with one or more image capture parameter values representing operational parameters of the video capture device; capturing, at the video capture device, motion data for each of the plurality of sequential images; estimating unwanted motion of the video capture device for each of the plurality of sequential images based on the motion data; estimating intrinsic data from the image capture parameter values, wherein each item of intrinsic data represents a mapping from a three-dimensional space to a two-dimensional space associated with a plane of the video capture device in the absence of motion, and wherein a respective item of intrinsic data is estimated for each of the plurality of sequential images; modifying each of the plurality of sequential images to remove the estimated unwanted motion based on the motion data and the image capture parameter values associated with each of the plurality of sequential images, wherein the modifying includes applying the intrinsic data to respective images; and storing each of the modified plurality of sequential images in a memory.

19. The non-transitory storage device of claim 18, wherein the image capture parameters comprise one or more of a principal point and a focal length, and the intrinsic data are estimated based on the one or more of a principal point and a focal length.

20. The non-transitory storage device of claim 18, wherein the instructions for capturing motion data for each of the plurality of sequential images comprise instructions for capturing motion data for each of the plurality of sequential images at approximately the same time as each of the plurality of sequential images was captured.

21. The non-transitory storage device of claim 20, wherein the motion data for each frame comprises information representing motion in more than one direction.

22. The non-transitory storage device of claim 18, wherein the instructions for capturing motion data comprise instructions for capturing motion data at a gyroscopic sensor.

23. The non-transitory storage device of claim 22, wherein the instructions for capturing motion data further comprise instructions for capturing acceleration data from an accelerometer sensor.

24. The non-transitory storage device of claim 18, further comprising instructions for determining rotational information for each of the plurality of sequential images based on the motion data for each pair of successive images in the plurality of sequential images.

25. The non-transitory storage device of claim 18, wherein the instructions for estimating unwanted motion for a specified image from the plurality of sequential images, comprise:

instructions for identifying a motion of the video capture device based on a first specified number of images from the plurality of sequential images captured before the specified image and a second specified number of images from the plurality of sequential images captured after the specified image;

instructions for filtering the identified motion of the video capture device to generate a filtered motion, the filtered motion having a value corresponding to the specified image; and instructions for determining the difference between the value of the filtered motion corresponding to the specified image and a location of the specified image based on the motion data.

26. An electronic device, comprising:

a video capture sensor;

a motion sensor;

a programmable control device communicatively coupled to the memory; and a memory communicatively coupled to the video capture circuit, the motion sensor, and the programmable control device, the memory having computer program code stored therein for causing the programmable control device to— capture a plurality of sequential images from the video capture sensor, the electronic device having image capture parameters wherein each of the plurality of sequential images is associated with values corresponding to the image capture parameters at the time each of the images was captured;

capture motion information at the motion sensor for each of the plurality of sequential images, wherein the motion data for each image in the plurality of sequential images is captured at approximately the same time as each image was captured;

estimate an unwanted motion for each of the plurality of sequential images based on each image's motion information;

estimating intrinsic data from the image capture parameter values, wherein each item of intrinsic data represents a mapping from a three-dimensional space to a two-dimensional space associated with a plane of the video capture device in the absence of motion, and wherein a respective item of intrinsic data is estimated for each of the plurality of sequential images;

apply a transform to each of the plurality of sequential images to substantially remove the estimated unwanted motion, wherein the transform applied to each of the plurality of sequential images is based on each image's image capture parameter values and motion information, and wherein the transform includes applying the intrinsic data to respective images; and store each of the transformed plurality of sequential images in the memory.

27. The electronic device of claim 26, wherein the motion sensor comprises a gyroscopic sensor.

28. The electronic device of claim 26, wherein the memory further comprises computer program code to determine rotational information for each of the plurality of sequential images based on the motion information for each pair of successive images in the plurality of sequential images.

29. The electronic device of claim 26, wherein the computer program code to estimate unwanted motion for a specified image from the plurality of sequential images, comprises:

computer program code to identify a motion of the video capture device based on a first specified number of images from the plurality of sequential images captured before the specified image and a second specified number of images from the plurality of sequential images captured after the specified image;

computer program code to filter the identified motion of the video capture device to generate a filtered motion, the filtered motion having a value corresponding to the specified image; and computer program code to determine the difference between the value of the filtered motion corresponding to the specified image and a location of the specified image based on the motion data.

* * * * *